US012704773B2

(12) United States Patent
Chen et al.

(10) Patent No.: US 12,704,773 B2
(45) Date of Patent: Aug. 11, 2026

(54) LIGHT SOURCE MODULE

(71) Applicant: Qisda Corporation, Taoyuan City (TW)

(72) Inventors: Hsin-Liang Chen, Taoyuan City (TW); Sheng-Wen Hu, Taoyuan City (TW); Chun Ming Shen, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 216 days.

(21) Appl. No.: 18/604,356

(22) Filed: Mar. 13, 2024

(65) Prior Publication Data

US 2024/0337914 A1 Oct. 10, 2024

(30) Foreign Application Priority Data

Apr. 6, 2023 (CN) ........................ 202310359918.4

(51) Int. Cl.
*G03B 21/16* (2006.01)
*G03B 21/20* (2006.01)

(52) U.S. Cl.
CPC ......... *G03B 21/16* (2013.01); *G03B 21/2013* (2013.01); *G03B 21/2066* (2013.01)

(58) Field of Classification Search
CPC . G03B 21/16; G03B 21/2013; G03B 21/2066
See application file for complete search history.

(56) References Cited

U.S. PATENT DOCUMENTS 7,703,927 B2 * 4/2010 Utsunomiya ..... G02F 1/133385
349/161
2025/0126233 A1 * 4/2025 Yan ..................... H04N 9/3161

FOREIGN PATENT DOCUMENTS

| | | |
|---|---|---|
| CN | 102621784 | 9/2014 |
| CN | 113495417 | 10/2021 |

* cited by examiner

*Primary Examiner* — Fatima N Farokhrooz
(74) *Attorney, Agent, or Firm* — JCIPRNET

(57) ABSTRACT

A light source module includes a casing, a first light source disposed in the casing to emit a first light, a first semi-transparent and semi-reflective mirror disposed in the casing and located on an optical path of the first light, and a heat dissipation member disposed in the casing and located on a second axis of the first semi-transparent and semi-reflective mirror. A first part of the first light passes through the first semi-transparent and semi-reflective mirror or is reflected by the first semi-transparent and semi-reflective mirror and then travels along a first axis. A second part of the first light is reflected by the first semi-transparent and semi-reflective mirror or passes through the first semi-transparent and semi-reflective mirror and then travels along a second axis. The first part is more than the second part. The second part of the first light is directed to the heat dissipation member.

14 Claims, 6 Drawing Sheets

LIGHT SOURCE MODULE

CROSS-REFERENCE TO RELATED APPLICATION

This application claims the priority benefit of China application serial no. 202310359918.4, filed on Apr. 6, 2023. The entirety of the above-mentioned patent application is hereby incorporated by reference herein and made a part of this specification.

BACKGROUND

Technical Field

This disclosure relates to a light source module.

Description of Related Art

With the advancement of technology, the light emitting power of the light source module of electronic devices (e.g. projectors) is getting higher and higher. During the process of light passing through or being reflected by the optical components, a small portion of the light may not pass through or be reflected by the optical components and be irradiated to the plastic casing, resulting in the melting of the plastic casing.

SUMMARY

The disclosure provides a light source module, capable of effectively reducing a probability of light irradiation to a casing.

A light source module of the disclosure including a casing, a first light source, a first semi-transparent and semi-reflective mirror, and a heat dissipation member. The first light source is disposed in the casing to emit a first light. The first semi-transparent and semi-reflective mirror is disposed in the casing and is located on an optical path of the first light. A first part of the first light passes through the first semi-transparent and semi-reflective mirror or is reflected by the first semi-transparent and semi-reflective mirror and then travels along a first axis. A second part of the first light is reflected by the first semi-transparent and semi-reflective mirror or passes through the first semi-transparent and semi-reflective mirror and then travels along a second axis. The first part is more than the second part. The heat dissipation member is disposed in the casing and is located on the second axis of the first semi-transparent and semi-reflective mirror. The second part of the first light is directed to the heat dissipation member.

In an embodiment of the disclosure, the casing includes a supporting rib, the heat dissipation member abuts against the supporting rib and has an air layer between the casing. In an embodiment of the disclosure, the casing is a plastic casing.

In an embodiment of the disclosure, the light source module further includes a second light source to emit a second light. The first semi-transparent and semi-reflective mirror is located between the second light source and the heat dissipation member, and is located on an optical path of the second light. A part of the second light is reflected by the first semi-transparent and semi-reflective mirror.

In an embodiment of the disclosure, the light source module further includes a second semi-transparent and semi-reflective mirror disposed in the casing, located on the second axis of the first semi-transparent and semi-reflective mirror and located on the optical path of the second light. The first semi-transparent and semi-reflective mirror is located between the second semi-transparent and semi-reflective mirror and the heat dissipation member. The part of the second light passes through the second semi-transparent and semi-reflective mirror.

In an embodiment of the disclosure, the light source module further includes a third light source to emit a third light. The first semi-transparent and semi-reflective mirror is located on an optical path of the third light, and a part of the third light is reflected by the first semi-transparent and semi-reflective mirror.

A light source module of the disclosure including a casing, a first light source, a first semi-transparent and semi-reflective mirror, and a reflector. The first light source is disposed in the casing to emit a first light. The first semi-transparent and semi-reflective mirror is disposed in the casing and located on an optical path of the first light. A first part of the first light passes through the first semi-transparent and semi-reflective mirror or is reflected by the first semi-transparent and semi-reflective mirror and then travels along a first axis. A second part of the first light is reflected by the first semi-transparent and semi-reflective mirror or passes through the first semi-transparent and semi-reflective mirror and then travels along a second axis. The reflector is disposed in the casing and located on the second axis of the first semi-transparent and semi-reflective mirror. The second part of the first light is directed to the reflector, and is reflected back to the first semi-transparent and semi-reflective mirror by the reflector, and then passes through the first semi-transparent and semi-reflective mirror or is reflected by the first semi-transparent and semi-reflective mirror.

In an embodiment of the disclosure, the casing includes a supporting rib, the reflector abuts against the supporting rib and has an air layer between the casing.

In an embodiment of the disclosure, the casing is a plastic casing.

In an embodiment of the disclosure, the light source module further includes a second light source to emit a second light. The first semi-transparent and semi-reflective mirror is located between the second light source and the reflector, and is located on an optical path of the second light. A part of the second light is reflected by the first semi-transparent and semi-reflective mirror.

In an embodiment of the disclosure, the light source module further includes a second semi-transparent and semi-reflective mirror disposed in the casing, located on the second axis of the first semi-transparent and semi-reflective mirror and located on the optical path of the second light. The first semi-transparent and semi-reflective mirror is located between the second semi-transparent and semi-reflective mirror and the reflector, and the part of the second light passes through the second semi-transparent and semi-reflective mirror.

In an embodiment of the disclosure, the light source module further includes a third light source to emit a third light. The first semi-transparent and semi-reflective mirror is located on an optical path of the third light, and a first part of the third light is reflected by the first semi-transparent and semi-reflective mirror.

In an embodiment of the disclosure, the first part of the third light is more than a second part of the third light. The second part of the third light passes through the first semi-transparent and semi-reflective mirror and is directed to the reflector, is reflected back to the first semi-transparent and semi-reflective mirror by the reflector and is reflected by the first semi-transparent and semi-reflective mirror to be directed toward a wavelength conversion device disposed at the first light source, and a wavelength is converted to a wavelength of the first light.

In an embodiment of the disclosure, the light source module further includes a second semi-transparent and semi-reflective mirror disposed in the casing, located on the second axis of the first semi-transparent and semi-reflective mirror and located on an optical path of the second light. The first semi-transparent and semi-reflective mirror is located between the second semi-transparent and semi-reflective mirror and the reflector. The third light source is disposed on a third axis of the second semi-transparent and semi-reflective mirror. The third axis is parallel to the first axis. The second semi-transparent and semi-reflective mirror is located on the optical path of the third light, and the first part of the third light is sequentially reflected by the second semi-transparent and semi-reflective mirror and the first semi-transparent and semi-reflective mirror.

Based on the above, the first semi-transparent and semi-reflective mirror of the light source module of the disclosure is disposed in the casing and is located on the optical path of the first light. A relatively large portion of the first part of the first light passes through the first semi-transparent and semi-reflective mirror or is reflected by the first semi-transparent and semi-reflective mirror and then travels along a first axis. A relatively small portion of the second part of the first light is reflected by the first semi-transparent and semi-reflective mirror or passes through the first semi-transparent and semi-reflective mirror and then travels along a second axis. In an embodiment of the light source module of the disclosure, the heat dissipation member is specially disposed on the second axis of the first semi-transparent and semi-reflective mirror, so that the second part of the first light may be irradiated to the heat dissipation member to avoid the second part of the first light from directly irradiating the casing, which would result in melting of the casing. In addition, in another embodiment of the light source module of the disclosure, the reflector is specially disposed on the second axis of the first semi-transparent and semi-reflective mirror, and the second part of the first light is directed to the reflector, and is reflected back to the first semi-transparent and semi-reflective mirror by the reflector, and then passes through the first semi-transparent and semi-reflective mirror or is reflected by the first semi-transparent and semi-reflective mirror to avoid the second part of the first light from directly irradiating the casing at the back of the reflector, which would result in melting of the casing.

To make the aforementioned more comprehensive, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
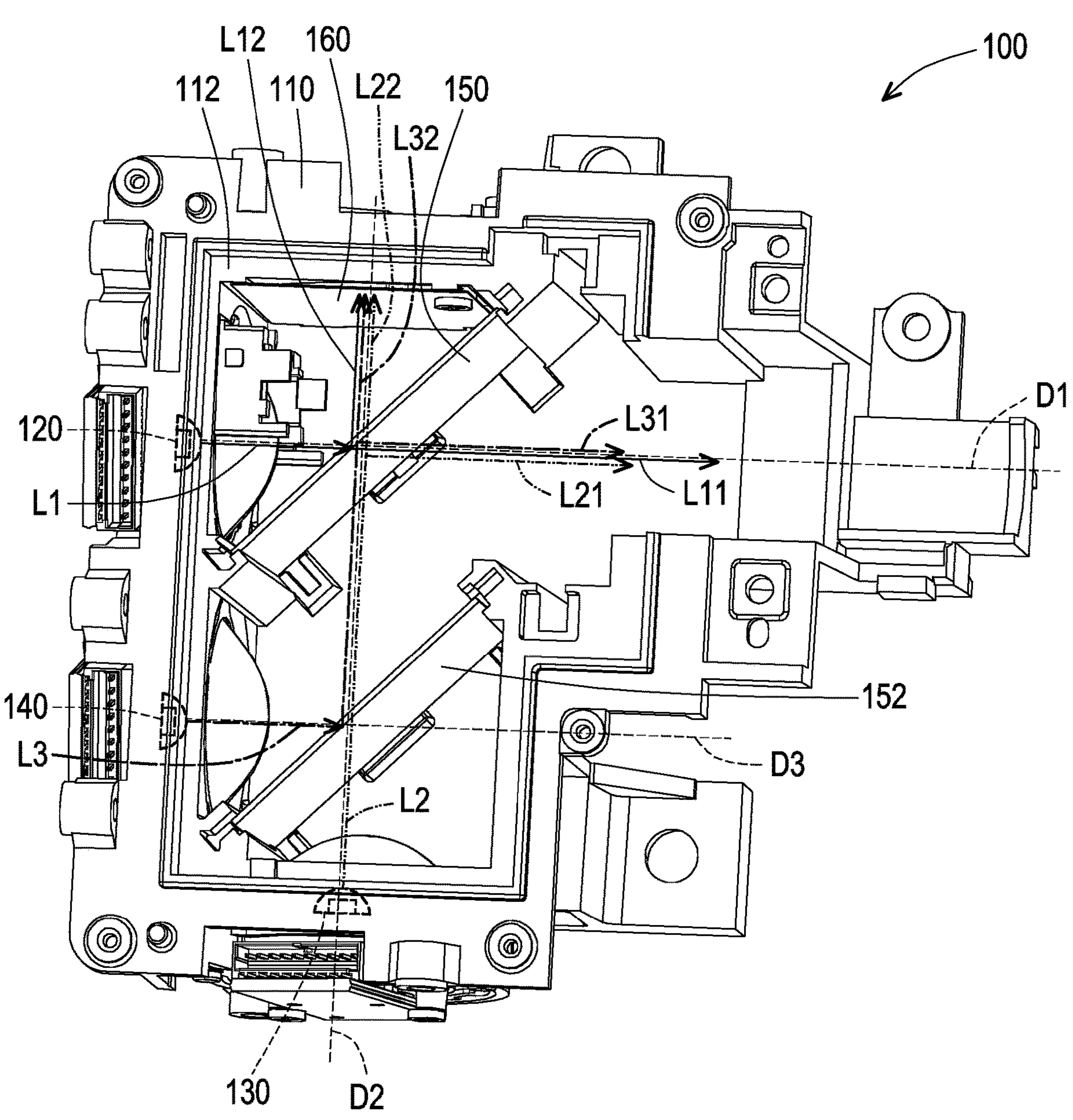
FIG. 1 is a schematic diagram of a light source module according to an embodiment of the disclosure.

FIG. 1 is a schematic diagram of a light source module according to an embodiment of the disclosure. Referring to FIG. 1, a light source module 100 of this embodiment is, for example, a light source module of a projector, but the type of application of the light source module 100 is not limited thereto. The light source module 100 includes a casing 110, a first light source 120, a first semi-transparent and semi-reflective mirror 150, and a heat dissipation member 160. The first light source 120 is disposed in the casing 110 to emit a first light L1. The first light source 120 is, for example, a green light source, but the type of the first light source 120 is not limited thereto.

The first semi-transparent and semi-reflective mirror 150 is disposed in the casing 110 and located on an optical path of the first light L1. In this embodiment, a first part L11 of the first light L1 passes through the first semi-transparent and semi-reflective mirror 150, travels along a first axis D1, and leaves the casing 110. A second part L12 of the first light L1 is reflected by the first semi-transparent and semi-reflective mirror 150, and travels along a second axis D2. The first part L11 is more than the second part L12.

Specifically, in this embodiment, the first semi-transparent and semi-reflective mirror 150 allows the first light L1 to pass through, but a small part of the first light L1 may still be reflected by the first semi-transparent and semi-reflective mirror 150. The first part L11 of the first light L1 is, for example, a part accounting for more than 90% of the first light L1, and the second part L12 of the first light L1 is, for example, a part accounting for less than 10% of the first light L1.

In this embodiment, the second part L12 of the first light L1 is reflected by the first semi-transparent and semi-reflective mirror 150 and may be directed toward the casing 110. The casing 110 is, for example, a plastic casing 110, and irradiation of the second part L12 of the first light L1 to the casing 110 may cause the casing 110 to melt.

In order to avoid the above situation, in this embodiment, the heat dissipation member 160 is disposed in the casing 110 and located on the second axis D2 of the first semi-transparent and semi-reflective mirror 150, and the second part L12 of the first light L1 is directed to the heat dissipation member 160. The heat dissipation member 160 is, for example, a metal plate, which has high heat dissipation properties and a high melting point, and is not easily damaged by direct light from the second part L12 of the first light L1. Therefore, the heat dissipation member 160 may dissipate the heat generated by the second part L12 of the first light L1 more quickly, and reduce the probability of the heat being transmitted to the casing 110 to avoid the casing 110 from melting.

Figure 2:
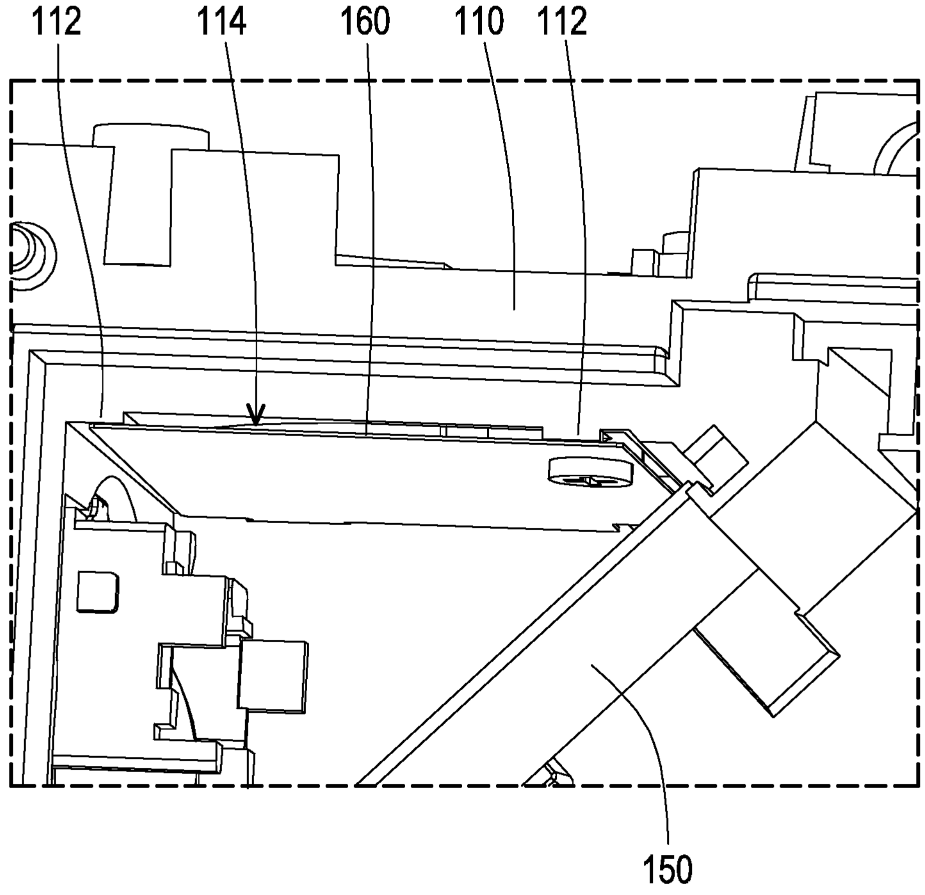
FIG. 2 is a schematic diagram of a heat dissipation member of the light source module in FIG. 1 abutting against a supporting rib.
Figure 3:
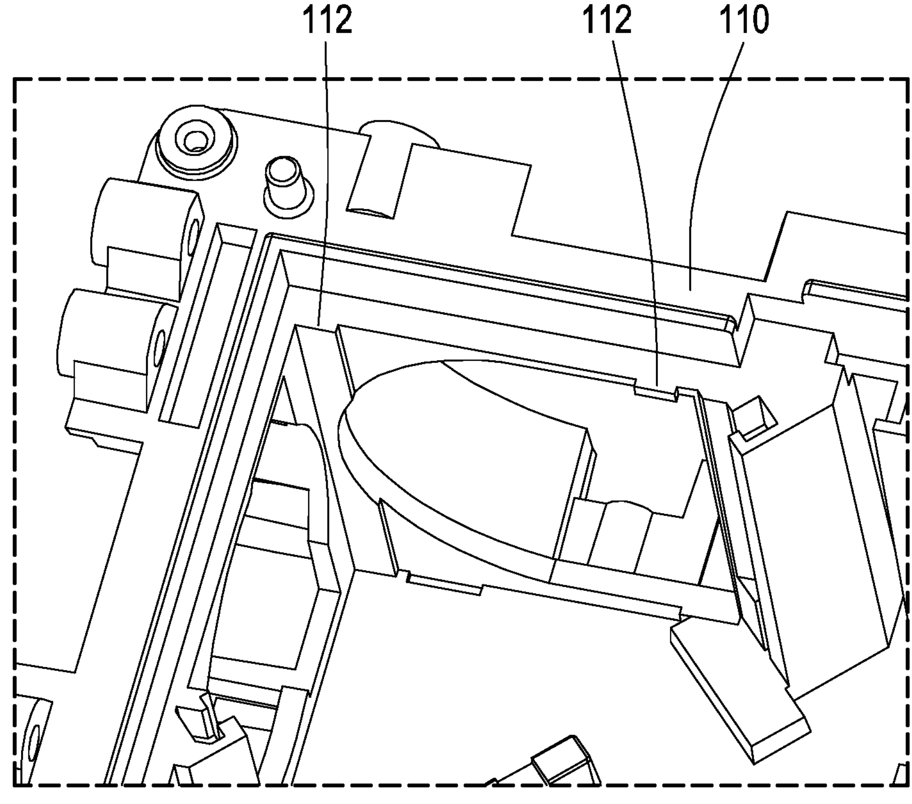
FIG. 3 is a schematic diagram of the supporting rib in FIG. 2.

FIG. 2 is a schematic diagram of a heat dissipation member of the light source module in FIG. 1 abutting against a supporting rib. FIG. 3 is a schematic diagram of the supporting rib in FIG. 2. Referring to FIG. 2 and FIG. 3, in this embodiment, the casing 110 includes a supporting rib 112, the heat dissipation member 160 abuts against the supporting rib 112 and has an air layer 114 between the casing 110. In this way, the probability of heat transfer from the heat dissipation member 160 to the casing 110 may be reduced to further prevent the casing 110 from melting.

It should be noted that, in other embodiments, with the different wavelengths of the light passing through the first semi-transparent and semi-reflective mirror 150 and the different relative positions of the first light source 120 and the first semi-transparent and semi-reflective mirror 150, the first part L11 of the first light L1 may be reflected by the first semi-transparent and semi-reflective mirror 150 and travel along the first axis D1. The second part L12 of the first light L1 may also pass through the first semi-transparent and semi-reflective mirror 150 and then travel along the second axis D2. The optical path of the first light L1 is not limited by FIG. 1.

Referring back to FIG. 1, in this embodiment, the light source module 100 further includes a second light source 130 to emit a second light L2. The second light source 130 is, for example, a red light source, but the type of the second light source 130 is not limited thereto. The first semi-transparent and semi-reflective mirror 150 is located between the second light source 130 and the heat dissipation member 160, and is located on an optical path of the second light L2.

In addition, the light source module 100 further includes a second semi-transparent and semi-reflective mirror 152 disposed in the casing 110, located on the second axis D2 of the first semi-transparent and semi-reflective mirror 150 and located on the optical path of the second light L2. The first semi-transparent and semi-reflective mirror 150 is located between the second semi-transparent and semi-reflective mirror 152 and the heat dissipation member 160.

In this embodiment, the second semi-transparent and semi-reflective mirror 152 allows the second light L2 to pass through, and the first semi-transparent and semi-reflective mirror 150 reflects the second light L2, but a small part of the second light L2 may still pass through the first semi-transparent and semi-reflective mirror 150.

In this embodiment, the second light L2 passes through the second semi-transparent and semi-reflective mirror 152, a first part L21 of the second light L2 is reflected by the first semi-transparent and semi-reflective mirror 150, and leaves the casing 110. A second part L22 of the second light L2 passes through the first semi-transparent and semi-reflective mirror 150 and is directed toward the heat dissipation member 160. The first part L21 of the second light L2 is, for example, a part accounting for more than 90% of the first light L1, and the second part L22 of the second light L2 is, for example, a part accounting for less than 10% of the first light L1. Similarly, the second part L22 of the second light L2 is directed to the heat dissipation member 160 and not directed to the casing 110 to melt the casing 110.

It should be noted that although a very small part of the second light L2 may be reflected by the second semi-transparent and semi-reflective mirror 152 and directed to the casing 110 on the right side of the second semi-transparent and semi-reflective mirror 152, due to the relatively low power of the second light L2, the casing 110 on the right side of the second semi-transparent and semi-reflective mirror 152 does not melt as a result of the experiments, and therefore there is no need to configure another heat dissipation member 160 in front of the casing 110 on the right side of the second semi-transparent and semi-reflective mirror 152. However, in an unillustrated embodiment, it is not precluded to configure the heat dissipation member 160 in the casing 110 near the second semi-transparent and semi-reflective mirror 152.

In addition, in this embodiment, the light source module 100 further includes a third light source 140 to emit a third light L3. The third light source 140 is, for example, a blue light source, but the type of the third light source 140 is not limited thereto.

The third light source 140 is disposed on a third axis D3 of the second semi-transparent and semi-reflective mirror 152, and the third axis D3 is parallel to the first axis D1. The second semi-transparent and semi-reflective mirror 152 and the first semi-transparent and semi-reflective mirror 150 are located on an optical path of the third light L3. A first part L31 of the third light L3 is reflected by the second semi-transparent and semi-reflective mirror 152 and the first semi-transparent and semi-reflective mirror 150 in sequence, and leaves the casing 110. Therefore, the first part L11 of the first light L1, the first part L21 of the second light L2, and the first part L31 of the third light L3 are mixed into white light before leaving the casing 110.

A second part L32 of the third light L3 is reflected by the second semi-transparent and semi-reflective mirror 152, passes through the first semi-transparent and semi-reflective mirror 150, and is directed to the heat dissipation member 160. The first part L31 of the third light L3 is, for example, a part accounting for more than 90% of the first light L1, and the second part L32 of the third light L3 is, for example, a part accounting for less than 10% of the first light L1. Similarly, the second part L32 of the third light L3 is directed toward the heat dissipation member 160 and not directed to the casing 110 to melt the casing 110.

That is, the second part L12 of the first light L1, the second part L22 of the second light L2, and the second part L32 of the third light L3 irradiate on the heat dissipation member 160, and the heat generated leaves from the heat dissipation member 160.

Other implementations are described below. It should be noted that the same or similar components as those in the previous embodiment are represented by the same or similar numeral references without further elaboration, and the main differences are described below.

Figure 4:
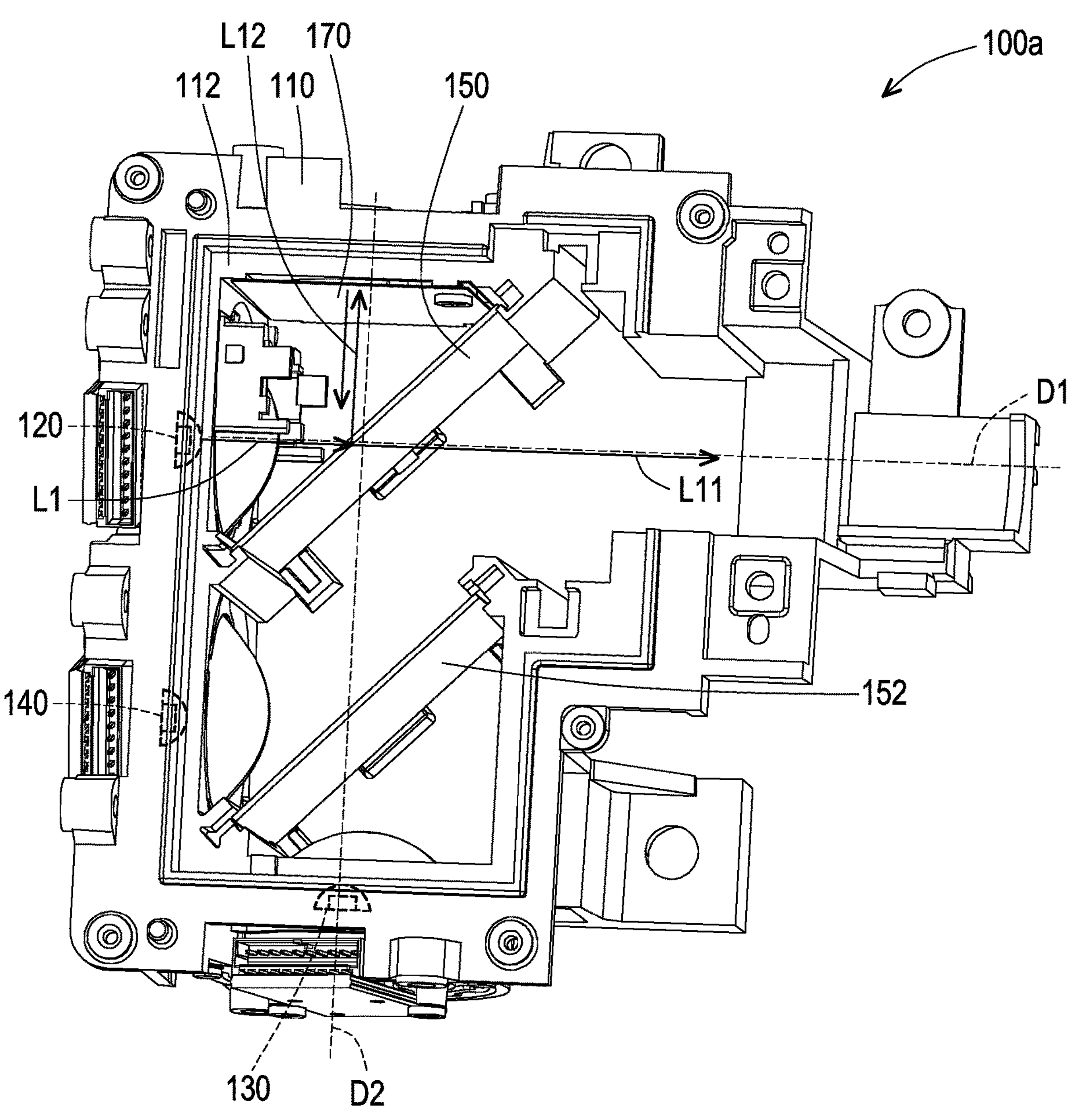
FIG. 4 is a schematic diagram of a light source module according to another embodiment of the disclosure.

FIG. 4 is a schematic diagram of a light source module according to another embodiment of the disclosure. Referring to FIG. 4, the main difference between a light source module **100*a* in FIG. 4 and the light source module 100 in FIG. 1 is that in this embodiment, the light source module 100*a* replaces the heat dissipation member 160 of FIG. 1 with a reflector 170. In this embodiment, the reflector 170 is, for example, mirror surface or bright aluminum, but the type of the reflector 170 is not limited thereto. Similarly, the reflector 170 abuts against the supporting rib 112 of the casing 110**.

As shown in FIG. 4, the reflector 170 is disposed in the casing 110 and located on the second axis D2 of the first semi-transparent and semi-reflective mirror 150. The first part L11 of the first light L1 passes through the first semi-transparent and semi-reflective mirror 150, travels along the first axis D1, and leaves the casing 110. The second part L12 of the first light L1 is reflected by the first semi-transparent and semi-reflective mirror 150, travels along the second axis D2, and is directed to the reflector 170. The second part L12 of the first light L1 is reflected again by the reflector 170.

The second part L12 of the first light L1 is directed toward the reflector 170 and is reflected by the reflector 170, and is not directly directed to the casing behind the reflector 170 and cause the casing to melt. Therefore, the casing 110 of the light source module 100*a* of this embodiment may be well protected.

Figure 5:
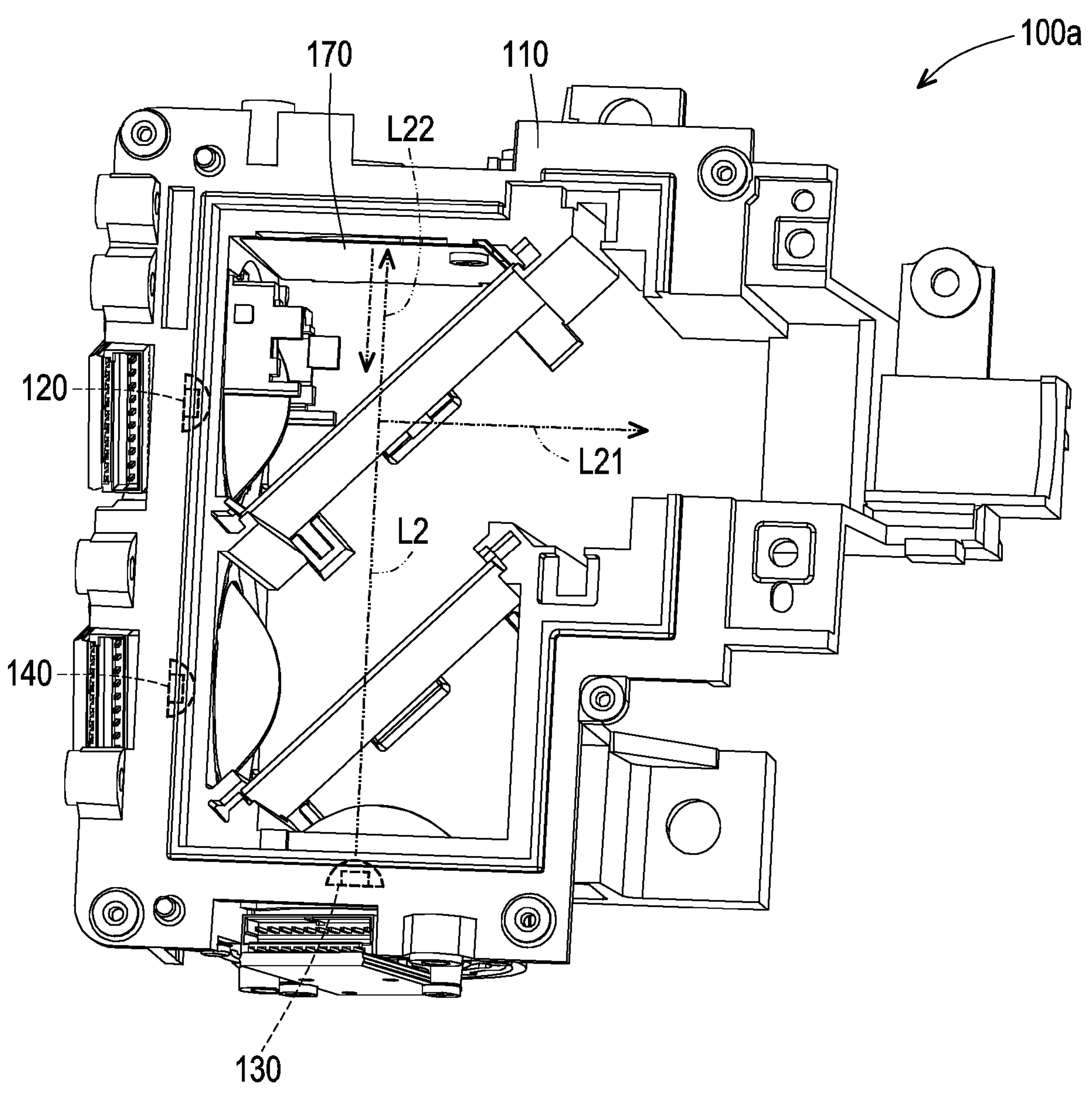
FIG. 5 is a schematic diagram of an optical path of a second light of a second light source of the light source module of FIG. 4.

FIG. 5 is a schematic diagram of an optical path of a second light of a second light source of the light source module of FIG. 4. Referring to FIG. 5, in this embodiment, the second light L2 passes through the second semi-transparent and semi-reflective mirror 152, the first part L21 of the second light L2 is reflected by the first semi-transparent and semi-reflective mirror 150, and leaves the casing 110. The second part L22 of the second light L2 passes through the first semi-transparent and semi-reflective mirror 150 and is directed toward the reflector 170. The second part L22 of the second light L2 is reflected again by the reflector 170.

Similarly, the second part L22 of the second light L2 is not directly directed to the casing behind the reflector 170 and cause the casing to melt. Therefore, the casing 110 of the light source module 100*a* of this embodiment may be well protected.

Figure 6:
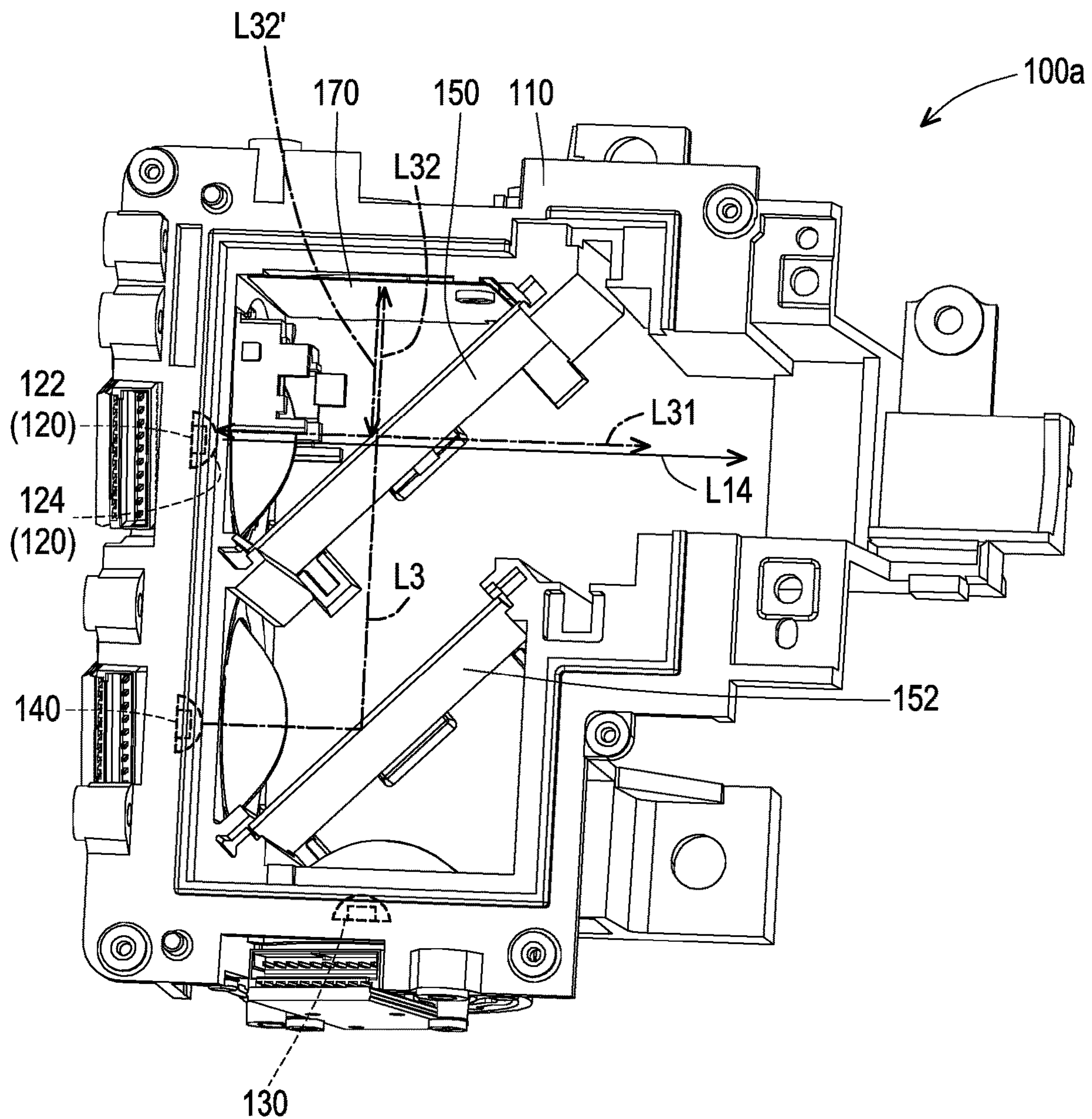
FIG. 6 is a schematic diagram of an optical path of a third light of a third light source of the light source module of FIG. 4.

FIG. 6 is a schematic diagram of an optical path of a third light of a third light source of the light source module of FIG. 4. Referring to FIG. 6, the first part L31 of the third light L3 is reflected by the second semi-transparent and semi-reflective mirror 152 and the first semi-transparent and semi-reflective mirror 150 in sequence, and leaves the casing 110. The second part L32 of the third light L3 is reflected by the second semi-transparent and semi-reflective mirror 152, passes through the first semi-transparent and semi-reflective mirror 150, and is directed toward the reflector 170.

Similarly, the second part L32 of the third light L3 is not directly directed to the casing behind the reflector 170 and cause the casing to melt. Therefore, the casing 110 of the light source module 100*a* of this embodiment may be well protected.

It should be noted that, in this embodiment, a second part L32' of the third light L3 reflected by the reflector 170 is directed toward the first semi-transparent and semi-reflective mirror 150, and is reflected by the first semi-transparent and semi-reflective mirror 150 to be directed toward a wavelength conversion device 124 disposed at the first light source 120.

In this embodiment, the first light source 120 includes a light emitting chip 122 and a wavelength conversion device 124 covering the light emitting chip 122. The wavelength conversion device 124 is, for example, a phosphor layer, but the type of the wavelength conversion device 124 is not limited thereto. The second part L32 of the third light L3 (e.g., blue light) is reflected to the wavelength conversion device 124 of the first light source 120, and the wavelength is converted to the wavelength of the first light L1 (e.g., green light), and is emitted as a converted light L14, thereby increasing the brightness of the green light. Therefore, the light source module 100*a* of this embodiment may also improve the light brightness through the above design, and provide good optical performance.

To sum up, the first semi-transparent and semi-reflective mirror of the light source module of the disclosure is disposed in the casing and is located on the optical path of the first light. A relatively large portion of the first part of the first light passes through the first semi-transparent and semi-reflective mirror or is reflected by the first semi-transparent and semi-reflective mirror and then travels along a first axis. A relatively small portion of the second part of the first light is reflected by the first semi-transparent and semi-reflective mirror or passes through the first semi-transparent and semi-reflective mirror and then travels along a second axis. In an embodiment of the light source module of the disclosure, the heat dissipation member is specially disposed on the second axis of the first semi-transparent and semi-reflective mirror, so that the second part of the first light may be irradiated to the heat dissipation member to avoid the second part of the first light from directly irradiating the casing, which would result in melting of the casing. In addition, in another embodiment of the light source module of the disclosure, the reflector is specially disposed on the second axis of the first semi-transparent and semi-reflective mirror, and the second part of the first light is directed to the reflector, and is reflected back to the first semi-transparent and semi-reflective mirror by the reflector, and then passes through the first semi-transparent and semi-reflective mirror or is reflected by the first semi-transparent and semi-reflective mirror to avoid the second part of the first light from directly irradiating the casing at the back of the reflector, which would result in melting of the casing.

It will be apparent to those skilled in the art that various modifications and variations can be made to the disclosed embodiments without departing from the scope or spirit of the disclosure. In view of the forthcoming, it is intended that the disclosure covers modifications and variations provided that they fall within the scope of the following claims and their equivalents.

What is claimed is:

1. A light source module comprising:

a casing;

a first light source disposed in the casing to emit a first light;

a first semi-transparent and semi-reflective mirror disposed in the casing and located on an optical path of the first light, wherein a first part of the first light passes through the first semi-transparent and semi-reflective mirror or is reflected by the first semi-transparent and semi-reflective mirror and then travels along a first axis, a second part of the first light is reflected by the first semi-transparent and semi-reflective mirror or passes through the first semi-transparent and semi-reflective mirror and then travels along a second axis, and the first part is more than the second part;

a heat dissipation member disposed in the casing and located on the second axis of the first semi-transparent and semi-reflective mirror, wherein the second part of the first light is directed to the heat dissipation member.

2. The light source module according to claim 1, wherein the casing comprises a supporting rib, the heat dissipation member abuts against the supporting rib and has an air layer between the casing.

3. The light source module according to claim 1, wherein the casing is a plastic casing.

4. The light source module according to claim 1 further comprising a second light source to emit a second light, wherein the first semi-transparent and semi-reflective mirror is located between the second light source and the heat dissipation member, and is located on an optical path of the second light, a part of the second light is reflected by the first semi-transparent and semi-reflective mirror.

5. The light source module according to claim 1 further comprising a third light source to emit a third light, wherein the first semi-transparent and semi-reflective mirror is located on an optical path of the third light, and a part of the third light is reflected by the first semi-transparent and semi-reflective mirror.

6. The light source module according to claim 4 further comprising a second semi-transparent and semi-reflective mirror disposed in the casing, located on the second axis of the first semi-transparent and semi-reflective mirror and located on the optical path of the second light, wherein the first semi-transparent and semi-reflective mirror is located between the second semi-transparent and semi-reflective mirror and the heat dissipation member, and the part of the second light passes through the second semi-transparent and semi-reflective mirror.

7. A light source module comprising:

a casing;

a first light source disposed in the casing to emit a first light;

a first semi-transparent and semi-reflective mirror disposed in the casing and located on an optical path of the first light, wherein a first part of the first light passes through the first semi-transparent and semi-reflective mirror or is reflected by the first semi-transparent and semi-reflective mirror and then travels along a first axis, a second part of the first light is reflected by the first semi-transparent and semi-reflective mirror or passes through the first semi-transparent and semi-reflective mirror and then travels along a second axis, and the first part is more than the second part;

a reflector disposed in the casing and located on the second axis of the first semi-transparent and semi-reflective mirror, wherein the second part of the first light is directed to the reflector, and is reflected back to the first semi-transparent and semi-reflective mirror by the reflector, and then passes through the first semi-transparent and semi-reflective mirror or is reflected by the first semi-transparent and semi-reflective mirror.

8. The light source module according to claim 7, wherein the casing comprises a supporting rib, the reflector abuts against the supporting rib and has an air layer between the casing.

9. The light source module according to claim 7, wherein the casing is a plastic casing.

10. The light source module according to claim 7 further comprising a second light source to emit a second light, wherein the first semi-transparent and semi-reflective mirror is located between the second light source and the reflector, and is located on an optical path of the second light, a part of the second light is reflected by the first semi-transparent and semi-reflective mirror.

11. The light source module according to claim 7 further comprising a third light source to emit a third light, wherein the first semi-transparent and semi-reflective mirror is located on an optical path of the third light, and a first part of the third light is reflected by the first semi-transparent and semi-reflective mirror.

12. The light source module according to claim 10 further comprising a second semi-transparent and semi-reflective mirror disposed in the casing, located on the second axis of the first semi-transparent and semi-reflective mirror and located on the optical path of the second light, wherein the first semi-transparent and semi-reflective mirror is located between the second semi-transparent and semi-reflective mirror and the reflector, and the part of the second light passes through the second semi-transparent and semi-reflective mirror.

13. The light source module according to claim 11, wherein the first part of the third light is more than a second part of the third light, the second part of the third light passes through the first semi-transparent and semi-reflective mirror and is directed to the reflector, is reflected back to the first semi-transparent and semi-reflective mirror by the reflector and is reflected by the first semi-transparent and semi-reflective mirror to be directed toward a wavelength conversion device disposed at the first light source, and a wavelength is converted to a wavelength of the first light.

14. The light source module according to claim 11 further comprising a second semi-transparent and semi-reflective mirror disposed in the casing, located on the second axis of the first semi-transparent and semi-reflective mirror and located on an optical path of the second light, wherein the first semi-transparent and semi-reflective mirror is located between the second semi-transparent and semi-reflective mirror and the reflector, the third light source is disposed on a third axis of the second semi-transparent and semi-reflective mirror, the third axis is parallel to the first axis, the second semi-transparent and semi-reflective mirror is located on the optical path of the third light, and the first part of the third light is sequentially reflected by the second semi-transparent and semi-reflective mirror and the first semi-transparent and semi-reflective mirror.

* * * * *